US006400382B1

(12) United States Patent
Davis

(10) Patent No.: US 6,400,382 B1
(45) Date of Patent: Jun. 4, 2002

(54) APPARATUS AND METHOD FOR A SHORTCUT LINK CREATION SYSTEM IN A COMPUTER SYSTEM

(75) Inventor: Kenneth P. Davis, Brighton, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/170,507

(22) Filed: Oct. 13, 1998

(51) Int. Cl.$^7$ .................................................. G06F 3/00

(52) U.S. Cl. ...................... 345/847; 345/846; 345/805; 345/839; 345/843; 709/100

(58) Field of Search .......................... 709/100; 345/805, 345/839, 843, 846, 847, 760; 348/565, 906

(56) References Cited

U.S. PATENT DOCUMENTS

| 5,877,765 A | * | 3/1999 | Dickman et al. ............ 345/738 |
| 5,886,699 A | * | 3/1999 | Belfiore et al. .............. 345/843 |
| 6,028,600 A | * | 2/2000 | Rosin et al. ................. 345/327 |
| 6,072,483 A | * | 6/2000 | Rosin et al. ................. 345/716 |
| 6,295,057 B1 | * | 9/2001 | Rosin et al. ................. 345/744 |

* cited by examiner

Primary Examiner—Majid A. Banankhah

(57) ABSTRACT

Apparatus and method are provided for implementing a link system that is configured to automatically find all third party applications that are installed on a user system, and that provides shortcuts or links to the applications from a single program container (i.e. folder or group). The link system searches each current container for shortcuts or links to application programs and when an application program is found within the current container, the link system copies the shortcut link of that application program to the destination container.

21 Claims, 4 Drawing Sheets

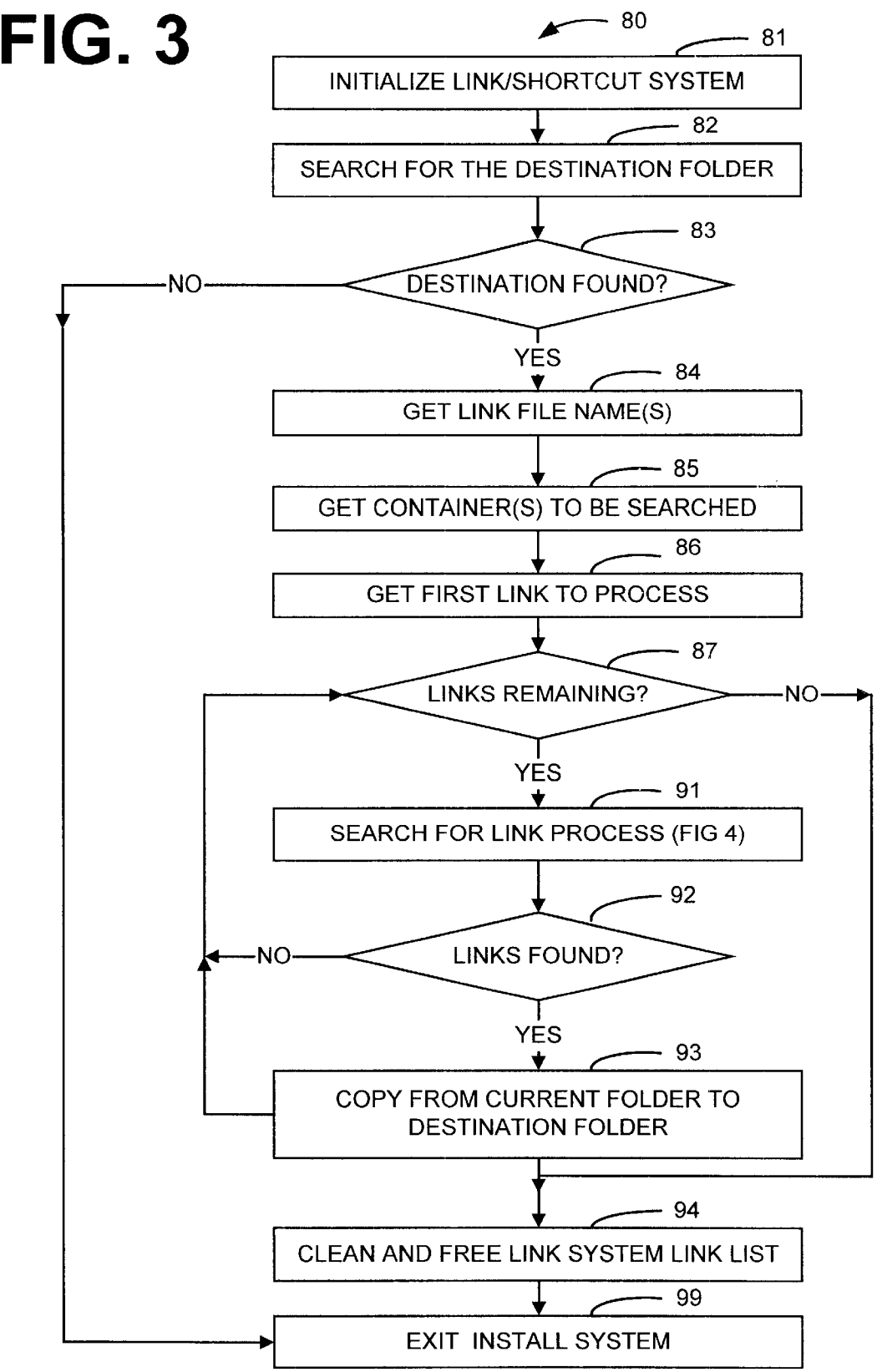

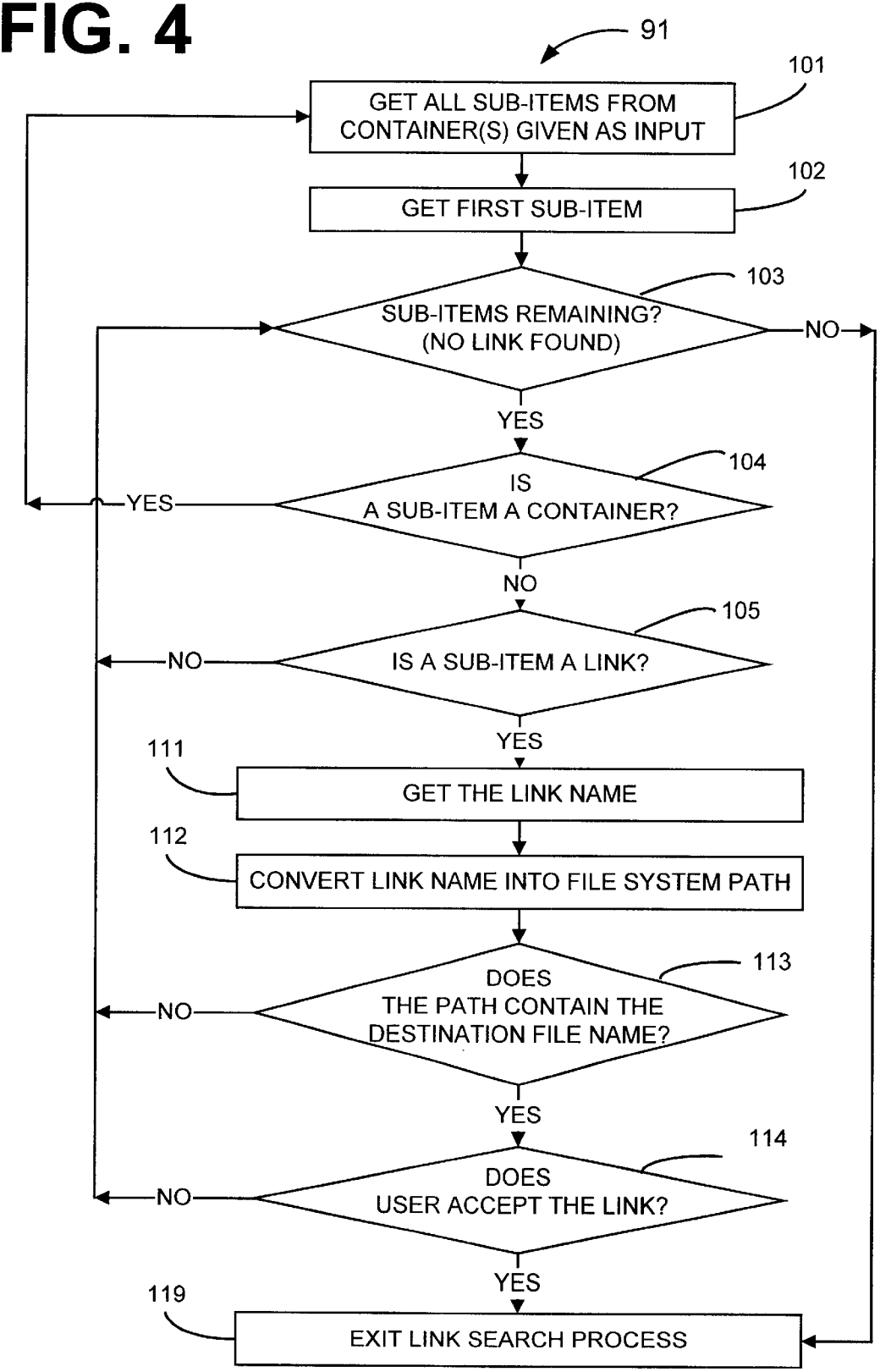

APPARATUS AND METHOD FOR A SHORTCUT LINK CREATION SYSTEM IN A COMPUTER SYSTEM

BACKGROUND OF THE INVENTION

1. Field of the Invention

The present invention generally relates to an apparatus and method for automatically finding a specific one, a selected group, or all third party applications that are installed on a computer system and providing shortcuts or links to those applications from within a container (i.e., folder or group).

2. Description of Related Art

Currently most software packages have a special program with the function of installing other programs, either on a storage medium or in memory. The install system might be used to guide a user through the complex procedure of setting up the application for a particular combination of machine and accessories. Install systems are necessary for copy protected applications which cannot be copied by normal system commands. Typically, these install systems limit the number of copies that can be installed.

Currently, most vendor specific software install systems store their vendor software in a program specific container (i.e., folder or group). This is problematic in that many applications that are device specific may reside in different program containers, thereby giving the user trouble in locating third party icons or run the executable program once each individual program is installed. It may also cause users problems for users because the users may forget they have installed a particular software package or version, and thus would not find a once forgotten program.

Heretofore, there has been no apparatus or method to provide shortcuts or links to a specific one, a selected group, or all third party applications within a particular container, folder, directory, or group.

SUMMARY OF THE INVENTION

The present invention provides an apparatus and method for automatically creating shortcuts or links for program applications. To achieve the advantages and novel features, the present invention is generally directed to an apparatus and method for implementation of a link system that is configured to automatically find a specific one, a selected group or all third party applications that are installed on a user system, and provides shortcuts or links to the applications from in a single program container (i.e., folder or group). Since the container (i.e., folder or group) is the first place users will go to execute programs, users will have no problem in finding all third party applications that were installed on a user's system.

In the preferred embodiment, the link system searches predetermined container(s) (i.e., folders or groups) for shortcuts or links to predetermined third party application program(s). When the application program(s) is found within the predetermined container(s), the link system copies the shortcut or link of that predetermined third party application program(s) to a destination container.

In an alternative embodiment, the link system searches a specific selected container, a selected group of containers, or all of containers, for shortcuts or links to a specific selected program, a selected group of programs, or all programs. When the selected program(s) is found within the selected container(s), the link system copies the shortcut or link of the program to the destination container. This provides additional flexibility and versatility for a user to define the breadth of the search with regard to the source container(s) and targeted program(s) for efficiency.

In yet another alternative embodiment, the link system may request a specific program container to be the current container for finding shortcuts or links. This allows additional accuracy for the user to define a particular program container to be searched and copied.

Another alternative embodiment allows the link system to search for the actual shortcut names for finding links to the selected application program(s) in the selected container(s). This provides additional flexibility for the user to define shortcut names that may be already defined on the computer system but are not the most convenient for the user.

A further alternative embodiment allows the link system to display the shortcuts or links to programs to permit the user to select which links to copy to, a destination container or directory. This provides additional flexibility for the user to identify and choose which selected program(s) are copied.

One more alternative embodiment provides for a nonconfigurable destination container or directory for the shortcuts or links to be copied. This provides additional security to the user to keep a standard destination container on all computer systems for program shortcuts or links.

In an additional alternative embodiment, the link system requests the user select the destination container or directory where the shortcuts or links should be copied to. This provides additional flexibility for the user to choose where the selected program(s) are copied.

In a supplementary alternative embodiment, the link system may be utilized in a standalone mode without the assistance of an install system. This provides additional versatility for the user to consolidate the program shortcuts or links at any time.

BRIEF DESCRIPTION OF THE DRAWINGS

The accompanying drawings, incorporated in and forming a part of the specification, illustrate several aspects of the present invention, and together with the description, serve to explain the principles of the invention. In the drawings, like reference numerals designate corresponding parts. In the drawings:

FIG. 3 is a flow chart of the link system process system of the present invention, as shown in FIGS. 1 and 2.

FIG. 4 is a flow chart of the search for a link process of the present invention, as shown in FIG. 3.

DETAILED DESCRIPTION OF THE PREFERRED EMBODIMENT

Figure 1:
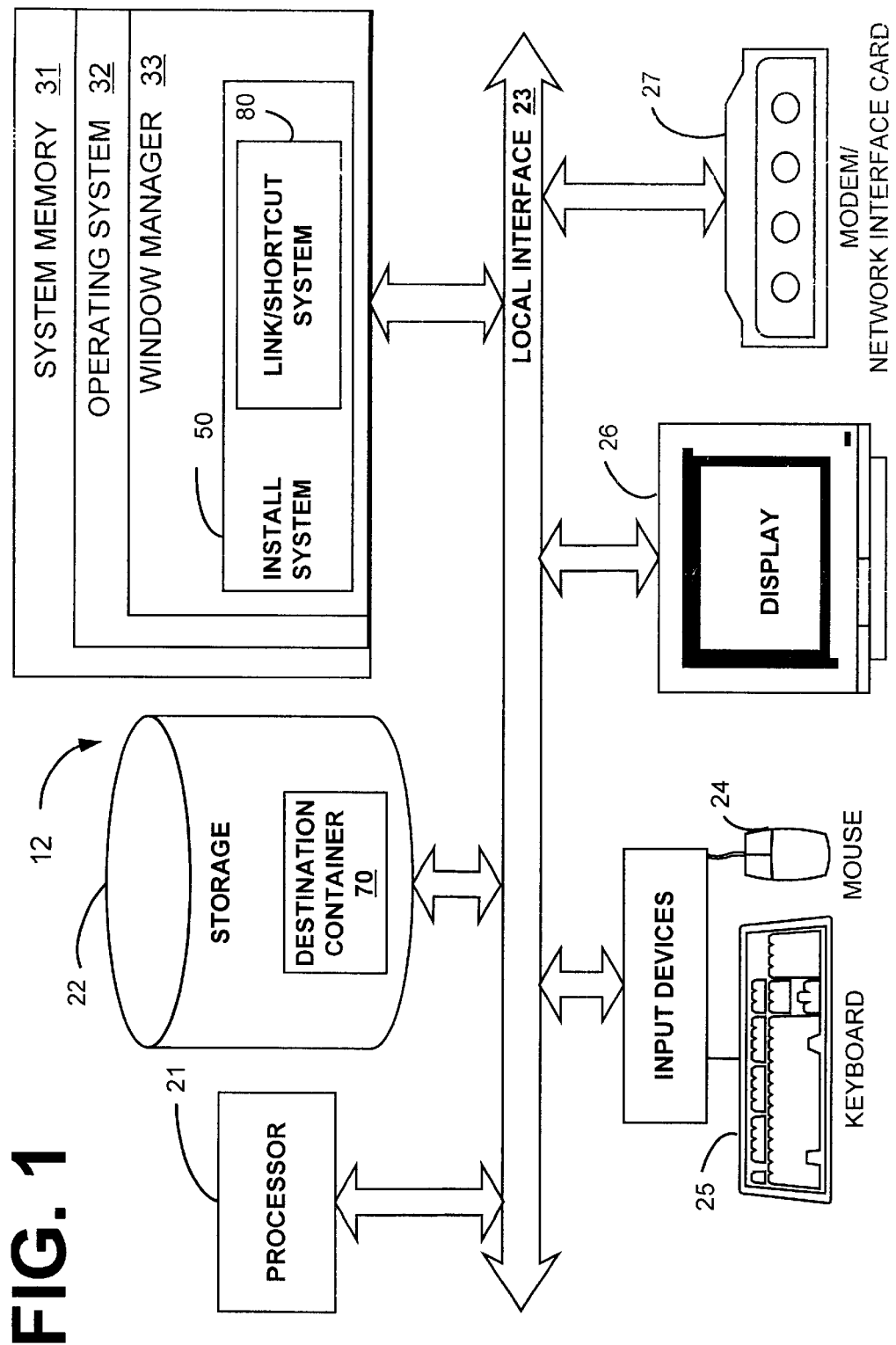
FIG. 1 is a block diagram of a computer system having the install system and the link shortcut program utilized by the present invention.

Reference will now be made in detail to the description of the invention as illustrated in the drawings. While the invention will be described in connection with these drawings, there is no intent to limit it to the embodiment(s) disclosed therein. On the contrary, the intent is to cover all alternatives, modifications, and equivalents included within the spirit and scope of the invention.

As illustrated in FIG. 1, a conventional computer system 12 comprises a processor 21, nonvolatile storage devices 22, and a system memory 31 (e.g., RAM) with an operating system 32 and window manager 33. The processor 21 accepts program code and data from the system memory 31 and/or storage 22 over the local interface 23, for example, one or more buses. Direction from the user can be signaled by using an input device, for example, a mouse 24, a keyboard 25, or some other input device as known in the art. The actions input and result output can be displayed on the display terminal 26.

The first embodiment of the present invention involves the link system 80 within an example install system 50. The install system 50 is the apparatus and method that interacts with the processor 21, storage device 22 and the memory 31, to install the requested programs/data and functionality requested by the client user. The install system 50 will be described hereafter in detail with regard to FIG. 2. In addition to the install system 50, the link system 80 of the present invention searches all the containers on the computer system 12 for predefined links to executable programs and copies them into a destination container 70 for easy access for the user. The link system 80 will be described hereafter in detail with regard to FIGS. 3 and 4.

Figure 2:
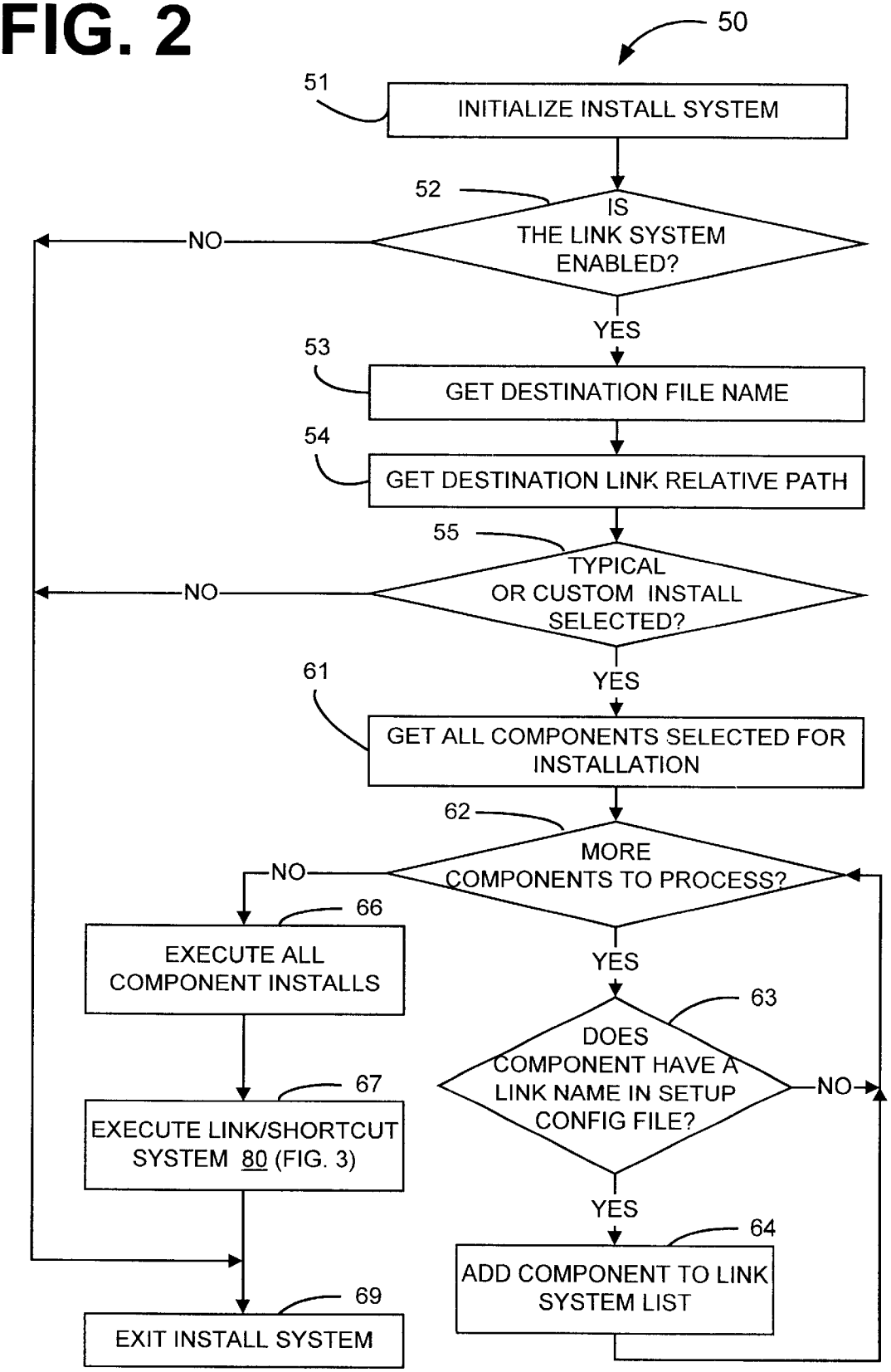
FIG. 2 is a flow chart of the install system of the present invention, as shown in FIG. 1.

Illustrated in FIG. 2 is the flow chart for an example of an install system 50 that initiates the link shortcut system 80 of the present invention. The flow chart illustrates the architecture, functionality, and operation of the install system 50. First, the install system 50 is initialized at step 51. Next, the install system checks to see if the link system 80 is enabled at step 52. If the link system 80 is enabled at step 52, then the install system gets the destination file name at step 53, and gets the destination link relative path at step 54. The destination file name and relative path provide the means of finding the destination container 70.

The install system 50 next checks if a typical or custom installation is being selected at step 55. If neither a custom nor typical installation is selected at step 55, the install system 50 proceeds to step 69 and exits. If either a custom or typical installation is selected at step 55, then the install system 50 acquires all the components selected for installation at step 61. The components selected are comprised of the pre-selected components for a typical installation or the components individually selected or group selected in the custom installation.

The install system 50 next checks if there are more components to process at step 62. If there are more components to process at step 62, then the install system 50 checks if the component has a link name in the component configuration file at step 63. If the component does have a link name in the component configuration file, then that component is added to the link system list at step 64, and then the install system 50 returns to step 62. If the component does not have a link name in the setup configuration file check at step 63, then the install system 50 returns to step 62, to determine if there are more components to be processed.

Once all the components have been identified for processing in steps 62 through 64, the install system 50 proceeds to step 66, which executes all of the component installations.

Once all the components installation are completed at step 66, the install system 50 executes the link system 80 at step 67, which is herein defined in detail with regard to FIGS. 3 and 4. Once the link system 80 execution is completed at step 67, the install system exits at step 69.

Another example of an install system that may be employed in the present invention is described in commonly assigned and copending U.S patent application entitled, "Apparatus and Method for an Install System for Third Party Applications," Ser. No. 09/170,692, filed on Oct., 13, 1998, herein incorporated by reference.

Illustrated in FIG. 3 is the link system 80. The flow chart of FIG. 3 shows the architecture, functionality, and operation of the link system 80.

First, the link system 80 is initialized at step 81. The link system 80 next searches f or the destination container 70 at step 82. The destination container 70 is also known as the product local/focal point. The destination container 70 can be specified by using a number of different methods including, but not limited to, being predetermined by the application program components being installed or predetermined by the example install system 50. In an alternative embodiment, the link system 80 requests the user to select the destination container 70 or directory where the shortcuts or links should be copied to at step 82. This allows additional flexibility for the user to define which container or directory is most convenient for the user.

The link system 80 verifies that the destination container 70 has been found at step 83. If no destination container 70 is found, then the link system 80 proceeds to step 99 and exits the link system 80.

If the destination container 70 being sought is found at step 83, then the link system 80 acquires the program file name(s) being searched for at step 84. The program file name(s) being searched for can be, but is not limited to, a specific program file name, a selected group of program file names, or all program file names. The group program file names can be indicated in one embodiment by using a wildcard character(s) in either the filename or extension. The group program file names can also be indicated by using multiple program file names. The program file name(s) being searched for can be acquired at step 84 from, for example but not limited to, the user input, the application program components being installed, the install system 50, or the computer system 12 default.

An alternative embodiment allows the link system 80 to acquire the actual shortcut names for finding links at step 84. This allows additional accuracy for the user to define a particular program container to be searched and copied.

The link system 80 acquires the container(s) to be searched at step 85. The container(s) being searched for can be, but is not limited to, a specific selected container, a selected group of containers, or all of containers. The container(s) being searched can be acquired at step 85 from, for example, the user input, the application program components being installed, the install system 50, or the computer system 12 default.

In an alternative embodiment, the link system 80 may acquire a specific program container to be the current container for finding shortcuts or links at step 85. If a program container name is indicated, then the link system 80 searches that program container for shortcuts or links to application programs. This provides additional flexibility for the user to define shortcut names that may be already defined on the computer system but are not the most convenient for the user.

The link system 80 next acquires the first link to be processed at step 86. The link system 80 checks to see if there are any links remaining in the link system list at step 87. If no links are remaining at step 87, then the link system 80 proceeds to cleanup and free-up the link system link list at step 94. If there are more links remaining in the check of the link system link list at step 87, then the link system 80 searches for the referenced link at step 91. The search for additional links is herein described in detail with regard to FIG. 4.

Upon completion of the search for additional links at step 91, the link system 80 checks if a referenced link was found on the computer system 12 at step 92. If the referenced link was not found on the computer system 12 at step 92, the link system 80 returns to step 87 to check if there are more links in the link system list remaining.

If the referenced link was found on the computer system 12 at step 92, the link system 80 copies the links in the current container to the destination container 70 at step 93, and then returns to step 86 for the check if additional links are remaining. As stated above, if there are no links remaining at step 87, then the link system 80 proceeds to cleanup and free-up the link system link list at step 94 and then exits the link system 80 at step 99.

Illustrated in FIG. 4 is the flow chart for link search process 91. First, the link process 91 gets all the sub-items at step 101 of a container(s) given as input at step 85 (FIG. 3). The link search process 91 next obtains the first sub-item of the link given as input at step 102.

The link search process 91 checks if any sub-items remain at step 103. This check determines if the search for link process 91 can find any additional links and if all containers have been checked. If additional links cannot be found, then the link search process 91 exits at step 119.

If additional sub-items are found, then the link search process 91 checks if the sub-item remaining is a container at step 104. If the sub-item is a container, the search for link process 91 then returns to step 101 to get all sub-items of the container given as input for processing.

If the sub-item remaining is found not to be a container at step 104, the search for link process 91 then checks if the sub-item is a link at step 105. If it is determined that the sub-item is not a link at step 105, then the search for link process 91 returns to step 103 to check for more sub-items remaining or additional links to be found.

If the check at step 105 does determine that a sub-item is a link, the search for link process 91 then gets the link name at step 111 and converts the link name into a file system path at step 112. The search for link process 91 then checks to see if the path contains the link file name at step 113.

If the path does not contain the link file name at step 113, the link search process 91 then returns to step 103 to check for additional sub-items remaining if additional links are found. If the link search process 91 does find that the path contains the destination file name at step 113, the link search process 91 displays the shortcuts or links to the user to allow the user to accept the link to be copy to a destination container 70 or directory, as indicated at step 114.

If the user accepts the link at step 114, then the search for link process 91 exits at step 119. If the user does not accept the link to be copied at step 114, then the link search process 91 returns to step 103 to check for more sub-items remaining or additional links to be found.

The install system and the link system 80 each comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronics having one or more wires, a portable computer diskette (magnetic), a random access memory (RAM) (magnetic), a read-only memory (OM) (magnetic), an erasable programmable read-only memory (EPROM or Flash memory) (magnetic), an optical fiber (optical), and a portable compact disc read-only memory (CDROM) (optical).

Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description has been presented for purposes of illustration and description. It is not intended to be exhaustive or to limit the invention to the precise forms disclosed. Obvious modifications or variations are possible in light of the above teachings.

The embodiment(s) discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A shortcut link apparatus on a computer system, said shortcut link apparatus comprising:

a means for searching each one of a plurality of current containers for shortcut links to a predefined group of application programs;

a means for maintaining shortcut links to said predefined group of said application programs in a destination container; and a means for copying a shortcut link to said maintaining means when an application program within said predefined group of said application programs is found within said each one of said plurality of said current containers.

2. The apparatus of claim 1, wherein said searching means further comprising:

a means for allowing a specific container to be designated as one of said current containers.

3. The apparatus of claim 1, wherein said searching means further comprising:

a means for permitting a user to select where to search for said shortcut links to said predefined group of said application programs further including:
a means for searching a specific container;
a means for searching all containers; and
a means for searching a selected group of said containers.

4. The apparatus of claim 1, wherein said maintaining means further comprising:

a means for allowing a user to specify said destination container to maintain said shortcut links to said predefined group of said application programs.

5. The apparatus of claim 1, wherein said maintaining means further comprising:

a means for providing a predetermined destination container to maintain said shortcut links to said predefined group of said application programs.

6. The apparatus of claim 1, wherein said copying means further comprising:

means for displaying said shortcut links to permit a user to select which of said shortcut links to copy to said maintaining means.

7. The apparatus of claim 1, wherein said predefined group of application programs further comprises a single predefined application program.

8. A method for finding shortcut links on a computer system, the method comprising the steps of:

searching each one of a plurality of current containers for shortcut links to a predefined group of application programs;

maintaining said shortcut links to said predefined group of application programs in a destination container; and copying a shortcut link to said destination container when an application program within said predefined group of said application programs is found within said each one of said plurality of said current containers.

9. The method of claim 8, wherein the searching step further comprises the step of:

allowing a specific container to be designated as one of said current containers.

10. The method of claim 8, wherein the searching step further comprises the step of:

permitting a user to select where to search for said shortcut links to said predefined group of said application programs, said permitting including the steps of:

searching a specific container from said plurality of said current containers;

searching all of said plurality of said current containers; and searching a selected group of containers from said plurality of said current containers.

11. The method of claim 8, wherein the maintaining step further comprises the step of:

allowing a user to specify said destination container to maintain said shortcut links to said predefined group of said application programs.

12. The method of claim 8 wherein the maintaining step further comprises the step of:

providing a predetermined destination container to maintain said shortcut links to said application programs.

13. The method of claim 8, wherein said copying step further comprises the step of:

displaying said shortcut links to said application programs to permit a user to select which of said shortcut links to copy to said destination container.

14. The method of claim 8, wherein the searching step further comprises the step of:

searching each one of said plurality of said current containers for a shortcut link to a single predefined application program.

15. A shortcut link apparatus on a computer system, said shortcut link apparatus comprising:

a logic configured to search each one of a plurality of current containers for a shortcut link to a predefined group of application programs;

a destination container to maintain a plurality of shortcut links to said predefined group of said application programs; and a logic configured to copy said shortcut link to said destination container when said predefined group of said application programs are found within said each one of said plurality of said current containers.

16. The apparatus of claim 15, wherein said logic configured to search further comprising:

logic configured to allow a user to designate a specific container as one of said current containers.

17. The apparatus of claim 15, wherein said logic configured to search further comprises:

a logic configured to allow a user to select which of said plurality of current containers to search for said shortcut links to said application programs, said user select logic including:

a logic configured to search a specific container from said plurality of said current containers;

a logic configured to search all of said plurality of said current containers; and a logic configured to search a selected group of containers from said plurality of said current containers.

18. The apparatus of claim 15, wherein said destination container is a predetermined destination container.

19. The apparatus of claim 15, wherein said logic configured to copy further comprises:

a logic configured to display said shortcut links to said predefined group of said application programs to permit a user to select which of said shortcut links to copy to said destination container.

20. The apparatus of claim 15, further comprising:

a logic configured to allow a user to designate a specific container as said destination container.

21. The apparatus of claim 15, wherein said predefined group of said application programs further comprises a single predefined application program.

* * * * *